Dec. 9, 1958   N. P. ROSATO ET AL   2,863,341
TREPANNING APPARATUS
Filed April 29, 1955   4 Sheets-Sheet 1
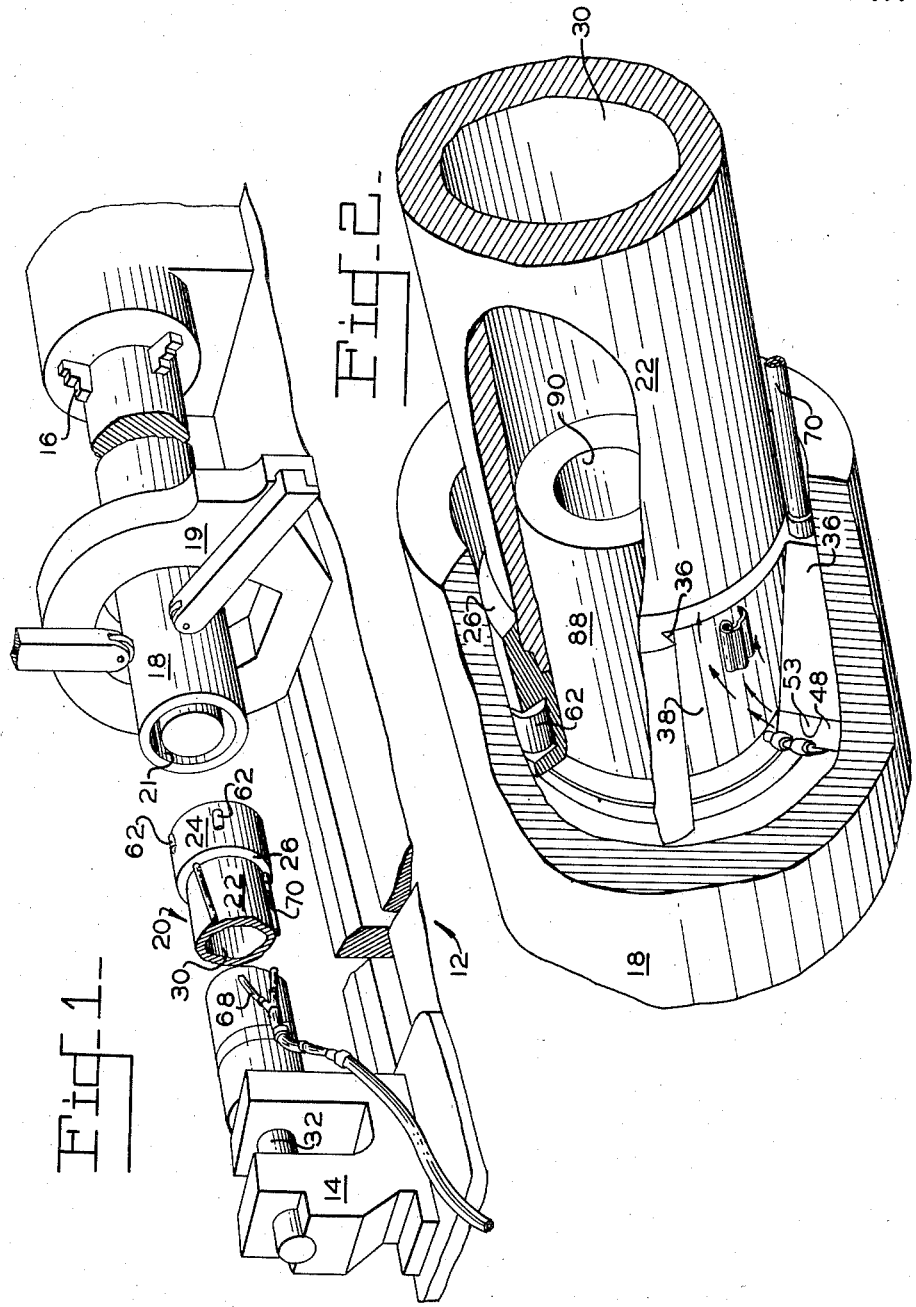
INVENTORS
Nicolo P. Rosato
Sven E. Siemen
BY
W. E. Thibodeau + A. W. Dew
ATTORNEYS Dec. 9, 1958  N. P. ROSATO ET AL  2,863,341
TREPANNING APPARATUS
Filed April 29, 1955  4 Sheets-Sheet 2

INVENTORS
Nicola P. Rosato
Sven E. Siemen
BY
W. E. Thibodeau + A. W. Dew
ATTORNEYS

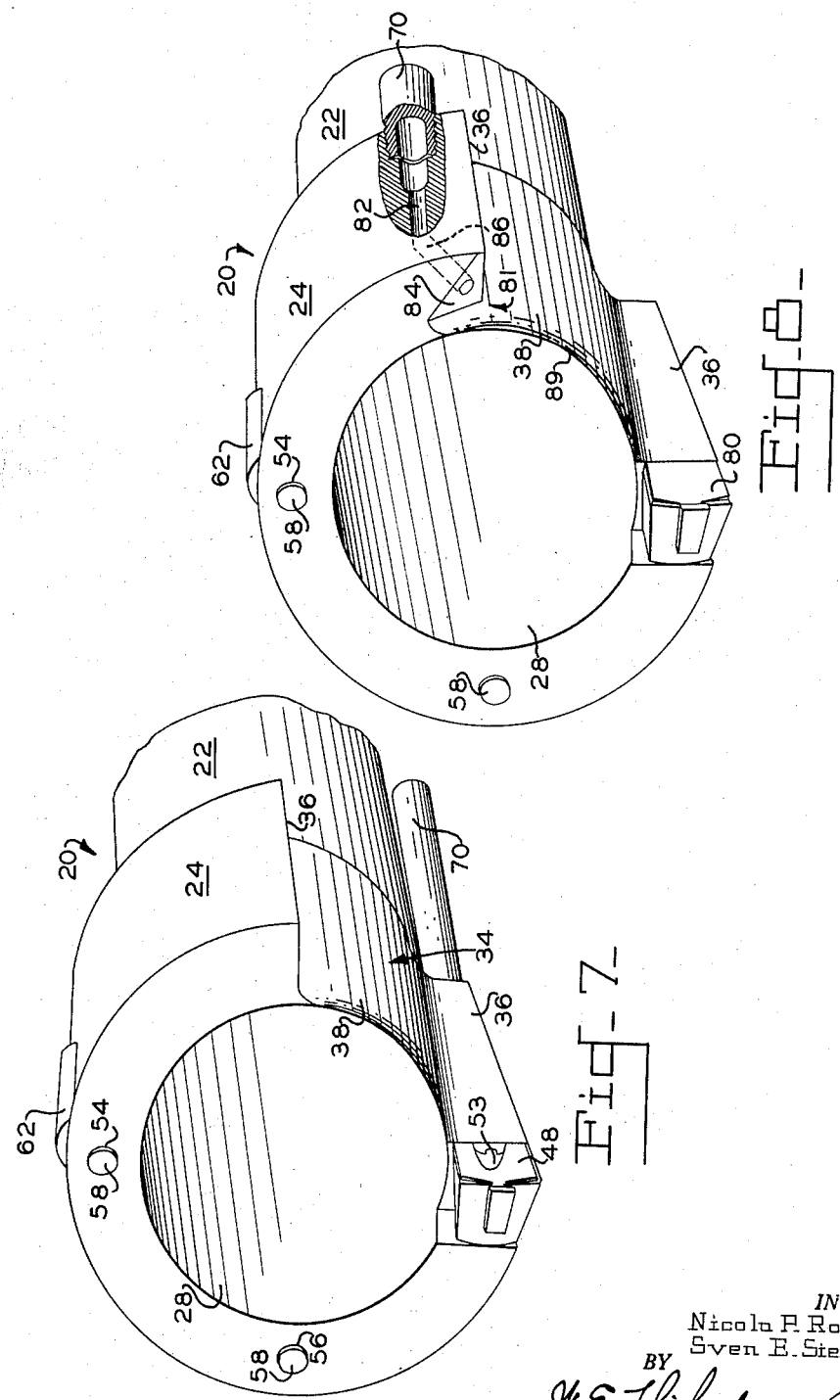

Dec. 9, 1958 N. P. ROSATO ET AL 2,863,341
TREPANNING APPARATUS
Filed April 29, 1955 4 Sheets-Sheet 4

INVENTORS
Nicola P. Rosato
Sven E. Siemen
BY
W. E. Thibodeau + A. W. Dew
ATTORNEYS United States Patent Office 2,863,341
Patented Dec. 9, 1958

2,863,341

TREPANNING APPARATUS

Nicola P. Rosato, Hyde Park, and Sven E. Siemen, Boxboro, Mass., assignors to the United States of America as represented by the Secretary of the Army Application April 29, 1955, Serial No. 505,072

3 Claims. (Cl. 77—69)

(Granted under Title 35, U. S. Code (1952), sec. 266)

The invention described herein may be manufactured and used by or for the Government for governmental purposes without the payment of any royalties thereon.

This invention relates to apparatus for cutting bores in a metallic body and is more particularly directed to an apparatus for cutting by trepanning which is especially well adapted to cutting holes in bodies made of titanium alloys.

The art of cutting bores in metallic bodies has been advanced considerably with the introduction of the trepanning method whereby the bores are cut with an annular groove which removes a solid core from the workpiece. This means a saving in time as the rate of penetration is increased materially over that required for solid bore drilling because less material in the workpiece has to be reduced to chips in forming the bore. The saving on material is also considerable, especially if the workpiece is made of critical, expensive material such as titanium, as the extracted core is of much greater value than the chips to which it would have been reduced in solid bore drilling.

One of the most troublesome problems inherent in the trepanning method is the removal of the chips from the cutting area. This has been overcome in the past by having the boring bar and trepanning head hollow and by providing a clearance between the outside of the boring bar and the circumference of the bore, with a channel in the head providing communication between such clearance and the cutting area in front of the head. Sometimes the oil for cooling and lubricating the working parts is supplied through the interior of the boring bar and trepanning head to the cutting area and evacuated, with the chips produced in cutting, along the aforementioned clearance between the outside of the boring bar and the bore.

This method, however, has not been satisfactory because the resistance to flow of the oil varies with the penetration of the boring bar into the workpiece and so the pressure of the oil to the cutting area also varies. Consequently, difficulty is encountered in maintaining the oil at sufficient pressure to perform the functions of cooling and lubricating the working parts and of evacuating the chips. The preferred method has been to install a seal head between the end of the workpiece and the boring bar and then to supply the oil up to some 200 p. s. i. pressure through the clearance between the boring bar and the machined bore and to evacuate the oil and chips through the interior hole in the trepanning head and boring bar. This method, still, is not entirely satisfactory as the pressure of the oil varies with the amount of penetration and it has been found necessary for the interior hole through the boring bar to be perfectly smooth or else any roughness will cause the chips to build up and prevent evacuation. Also, the method does not provide for the boring of a hollow workpiece wherein the oil would escape through the bore thereof unless blocked.

While the aforementioned methods may be adequate, if not completely satisfactory, when the workpiece is of ferrous alloys it is impractical when the workpiece is of an alloy of titanium because of the unique character of this metal. Among the problems which have to be overcome when a workpiece of an alloy of titanium is bored is the tendency for the material to work harden rapidly while being machined. Titanium is also a high friction material whereby extreme heat is generated in the tool and work when the chip is formed and removed. The heat at the bearing point on the tool contacted by the chips during removal has been reckoned as about 2200° F. compared to about 600° F. when 1020 steel is cut, and this becomes more of a problem through the poor heat conductivity of the metal. Titanium, further, has a high chemical and physical affinity for other metals and materials moving in contact with it to cause galling and alloying between the cutting tool and trepanning head and the material of the workpiece. Furthermore, the high tensile strength of titanium causes a greater thrust than ordinary to be placed against the wear pads, which are conventionally installed on the trepanning head to guide and center such head in the cut groove, as the cutting tool presses into the workpiece. Thus, galling is produced between the wear pads and the workpiece.

It is, therefore, the specific object of this invention to provide a trepanning apparatus which is especially well suited to the machining of titanium alloys.

It is also an object of this invention to provide a means of trepanning whereby the oil pressure at the cutting area is the same regardless of the amount of penetration of the boring bar into the workpiece.

It is another object of this invention to provide a means of trepanning that does not require an intricate and expensive oil pressure head or a machined, smoothly finished axial hole for the boring bar.

It is a further object of this invention to provide a trepanning apparatus whereby a hollow cylindrical core may be cut from a workpiece having a longitudinal bore therethrough or a solid cylindrical core from a solid workpiece.

It is a still further object of this invention to provide a trepanning apparatus whereby a stream of oil under extremely high pressure is directed upon the cutting tool to dissipate the excessive heat generated therein and to insure a film of oil between the cutting tool and work for reducing the friction between the forming chip and tool and for insulating the tool physically and chemically from the material of the workpiece.

It is another and still further object of this invention to provide a trepanning apparatus whereby the supplying of the oil to the cutting tool of a trepanning boring bar and the evacuation of the oil along with the machined chips are limited to the clearance formed between the outside of the boring bar and the circumference of the machined groove.

It is still another and further object of this invention to provide roller bearings in the trepanning head in place of wear pads and to lubricate the surfaces thereof with streams of oil under pressure to solve the problem of galling between the wear pads and the workpiece.

The specific nature of the invention as well as other objects and advantages thereof will clearly appear from a description of a preferred embodiment as shown in the accompanying drawings in which:

Fig. 1 is a perspective view reduced to show the trepanning tool of this invention and workpiece mounted in a lathe;

Fig. 2 is a perspective partially broken view of the trepanning tool in cutting relationship with a hollow workpiece;

Fig. 7 is an enlarged perspective view of the trepanning tool;

Fig. 8 is an enlarged perspective view of an alternate embodiment;

Figure 4:
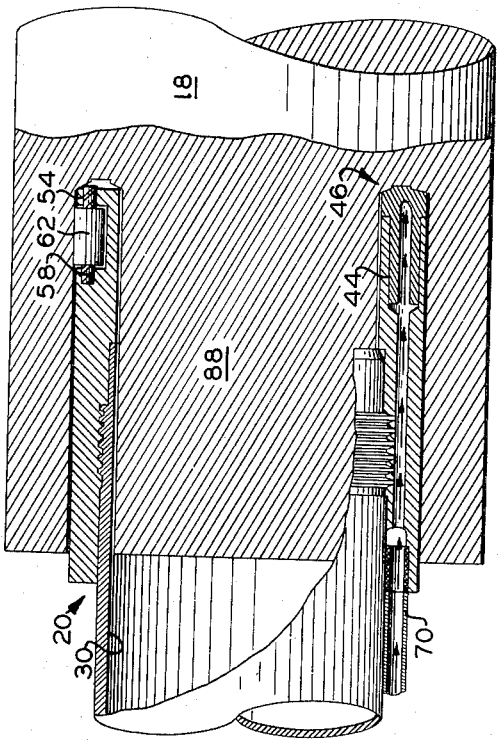
Fig. 4 is a view taken along line 4—4 of Fig. 3.
Figure 6:
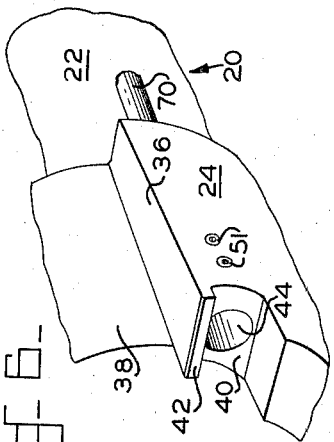
Fig. 6 is an enlarged perspective, fragmentary view showing the means provided for mounting the cutting tool to the trepanning tool.
Figure 3:
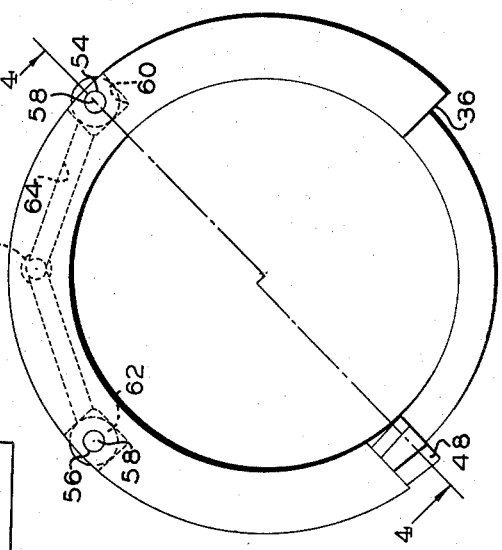
Fig. 3 is an enlarged end view of the trepanning tool.
Figure 5:
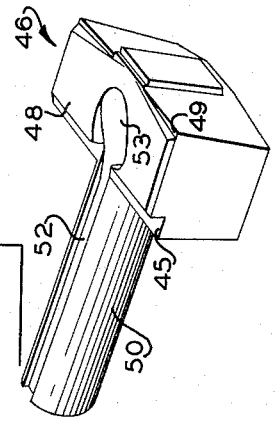
Fig. 5 is an enlarged view of the cutting tool.

Shown in the figures is a machine 12 for turning, such as a lathe, having a carriage 14 automatically movable along the bed thereof and a chuck 16 for rotatably holding in a horizontal position a cylindrical workpiece 18 which, for the present embodiment, is of an alloy of titanium. If necessary, because of the weight or length of workpiece 18, a steady rest 19 may be provided along the bed of machine 12 for holding such workpiece true while being rotated.

Also shown is a trepanning tool 20 for cutting an annular groove 21 in workpiece 18, as hereinafter described, which is comprised of a cylindrical boring bar 22 of greater length than the depth to which such groove is to be cut and a headpiece 24 threadably mounted on one end of such boring bar. Headpiece 24 is of larger diameter than boring bar 22 and thereby an annular shoulder 26 is formed at the junction thereof. An axial bore 28 extends through headpiece 24 to communicate with a coaxial well 30 of slightly larger diameter in boring bar 22. The surface finish of well 30 is not critical as will be disclosed hereinafter. Extending axially from the opposite end of boring bar 22 is a tailpiece 32 of smaller diameter which is mountable to carriage 14.

Provided in headpiece 24 is a longitudinal, substantially U-shaped recess 34 formed by spaced, radially disposed walls 36 and a connecting side 38 that extends from the forward side of such headpiece adjacent the perimeter of bore 28 to the rearward side of such headpiece adjacent the outside circumference of boring bar 22. Walls 36 are spaced sufficiently to permit a supply of oil and the chips produced in cutting annular groove 21 in workpiece 18 to pass freely therethrough but are less than 180° apart.

Machined into the front side of headpiece 24 is a rectangular channel 40, which is adjacent to and parallel with the one of walls 36 which is on the far side of recess 34, in respect to the rotation of workpiece 18, and which forms with recess 34 a wall 42. A bore 44 extends from channel 40, equidistant the ends thereof, longitudinally through headpiece 24 and replaceably received by such channel and bore is a cutting tool 46 comprised of a body portion 48, receivable by channel 40, and a shank portion 50, receivable by bore 44. A groove 45 is provided in the front face of cutting tool 46 to matingly receive wall 42 whereby the remainder of such front face is aligned with the associated one of the walls 36. Cutting tool 46 is secured in position by two set screws 51 threadably mounted in headpiece 24 for engagement with shank portion 50.

The cutting edge of cutting tool 46 is divided into three approximately equal widths with the central portion projecting forward from the side portions and such cutting edge is of sufficient width to cut an annular groove in workpiece 18 which will receive trepanning tool 20 without contact between headpiece 24 and the circumferences of such groove. Cutting tool 46 is also provided with a conventional chip breaker shoulder 49. Extending along shank portion 50 is an arcuate oil channel 52 which ends in a spoonlike depression 53 in the front face of body portion 48.

A cylindrical hole 54 extends longitudinally from the front face of headpiece 24 part way into such headpiece diametrically opposite the cutting edge of cutting tool 46, and a similar hole 56 extends likewise into such headpiece intermediate such cutting tool and hole 54, opposite recess 34. Mounted in holes 54 and 56 are axle members 58 upon which rollers 62 are rotatably mounted in cutout portions 60 provided therefor in headpiece 24. The diameters of rollers 62 are such that the rollers project from the circumference of headpiece 24 between .004 and .006 less than cutting tool 46 whereby the radial thrust of such headpiece produced by cutting tool 46 is balanced thereby.

Chordally disposed passageways 64 extend from cutout portions 60 toward each other to join a duct 66 that extends longitudinally from such junction rearwardly to shoulder 26. A tube 68 of smaller outside diameter than the width of shoulder 26 extends from duct 66 rearwardly along boring bar 22 to join with a tube 70, also of smaller outside diameter than the width of such shoulder, which is coupled at one end to bore 44 and is connectable at the other to an oil pump (not shown) which is adapted to provide a supply of oil at an adjustable pressure up to 5000 p. s. i. Thereby, oil is supplied by such pump to depression 53 in the front face of cutting tool 46 and to rollers 62.

Figure 9:
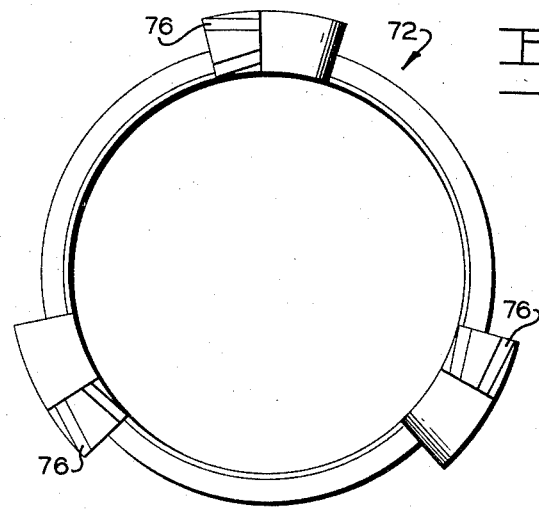
Fig. 9 is an enlarged front view of the pilot tool.
Figure 10:
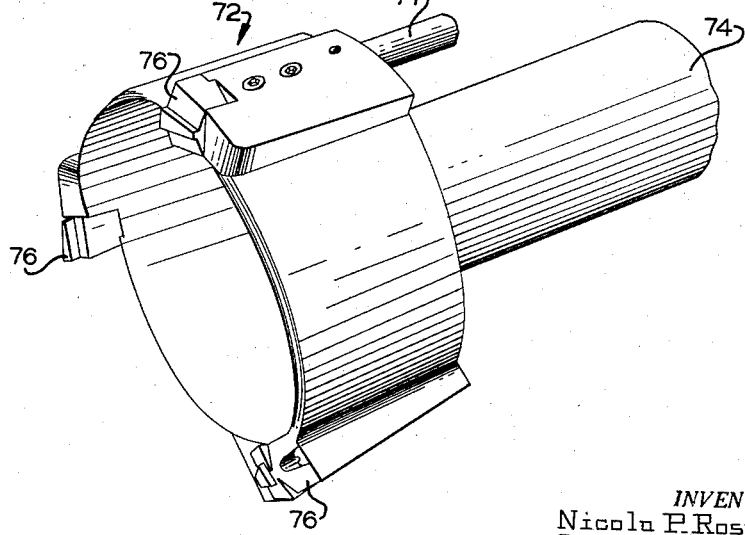
Fig. 10 is a perspective view of the pilot tool.

Also shown in Figs. 9 and 10 is a pilot tool 72 which is mountable to carriage 14 for starting annular groove 21 sufficiently to receive headpiece 24 so that rollers 62 therein make engagement with the larger circumference of such groove. Pilot tool 72 is composed of a shaft 74 mountable at one end to carriage 14. The opposite end of shaft 74 is provided with three tools 76 which extend forwardly for engagement with the end of workpiece 18 for cutting annular groove 21 thereinto up to the desired depth. Extending along shaft 74 is a tube 77 which is connectable at the rear end to the oil pump (not shown) and is provided at the opposite end with a nozzle (not shown) adapted to lubricate and cool the tools 76 and to wash away the chips formed thereby.

Shown in Fig. 8 is an alternate means of providing positive lubrication, cooling and chip removal which is similar to the aforedescribed means except that in the present embodiment cutting tool 46 is replaced by a cutting tool 80 without an oil groove. Tube 70 is coupled to a longitudinal bore 82 in headpiece 24 adjacent the leading one of the walls 36, in respect to rotation of workpiece 18. A V-cut 81 is made angularly into the edge formed by the front face of headpiece 24 and the one of the walls 36, which is adjacent bore 82 and opposite recess 34 from cutting tool 80, to form a planar surface 84 facing the cutting edge of such cutting tool. Extending into headpiece 24 from surface 84 is an aperture 86 which is in communication with bore 82 and is arranged to direct a jet of oil on the bottom of groove 21 slightly forward of cutting tool 80. An arcuate clearance 89 extends arcuately rearwardly into headpiece 24, in the area between walls 36 and bore 28, to permit uninterrupted play of the jet of oil from aperture 86 upon the desired position. Thus, the chips formed during cutting are driven away from the bottom of groove 21 and through recess 34 along the outside of boring bar 22.

Operation

To bore a hole through workpiece 18, such workpiece is mounted in chuck 16 of machine 12 and trued up, and pilot tool 72 is mounted to carriage 14 with tube 77 connected to the oil pump (not shown) which, as previously explained, is adapted to supply oil at an adjusted pressure up to 5000 p. s. i. The oil pump is started, whereby oil therefrom is discharged from the nozzle, and carriage 14 moved up to bring tools 76 of pilot tool 72 in engagement with the end of workpiece 18. Through automatic operation of machine 12, tools 76 cut into workpiece 18 to start groove 21 sufficiently to receive headpiece 24 so that rollers 62 therein make rotary engagement with the larger circumference of groove 21.

When groove 21 has been cut sufficiently, pilot tool 72 is removed and trepanning tool 20 equipped with cutting tool 46 is installed in place thereof. With headpiece 24 received by groove 21, the oil pump is turned on and adjusted to supply oil at approximately 2400 p. s. i. Machine 12 is then started and regulated to turn at 28 R. P. M. and cut at .006 I. P. R. which has been proved to be best suited for boring titanium.

The cutting of groove 21 is then continued by trepanning tool 20 until the entire length of workpiece 18 is cut and a removable core 88 is formed. During the cutting, cutting tool 46 is cooled and lubricated by oil supplied by high pressure from the pump through tube 70, bore 44 and channel 52 to the spoonlike depression 53 in the front face of such cutting tool whereby the oil is directed to the cutting edge and the working areas of such cutting tool. As titanium is a high friction material, extremely high temperature is produced at the area of cutting tool 46 where the forming chip rides along before being broken off and because of the low heat conductivity of the metal the heat remains in the area until dissipated by the oil. In previous means wherein the cutting area was flooded by oil, this high temperature caused the oil in contact with the heated area to boil off and consequently permit metal-to-metal contact between the material of the workpiece and the cutting tool. With titanium, this contact produces undesirable effects because of the high chemical and physical affinity of the metal with other mtaterial moving in contact with it which produces alloying and galling.

However, by the means of the present invention the jet of oil along the front face of cutting tool 46 concentrates the oil where needed, thus eliminating the need for an oil seal as with previous means, and with such force that an oil film between such cutting tool and the material of workpiece 18 is immediately replaced, in event of boiling off. Thereby, friction between cutting tool 46 and the material of workpiece 18 is reduced, and consequently heat and an insulating oil film is assured between such cutting tool and the material of such workpiece to prevent alloying and galling therebetween. Also, the heat which is generated in cutting tool 46 is rapidly dissipated by the rapid flow of the oil thereover, and the high pressure of such oil flow assures evacuation of the chips away from the cutting area through recess 34 and out along groove 21 to the bed of machine 12 where such chips are screened from the oil.

It is noted that cutting tool 46 is of three-section design whereby the width of the cut is divided into three narrower chips for easy removal. Also, as long as the chips are evacuated along groove 21 and not through the interior of boring bar 22 the surface finish of such interior is unimportant. It is, however, desirable that such interior bore be of larger diameter than that of core 88 to prevent contact therebetween.

It is also to be noted that by the present invention the problem previously encountered of galling between the conventional wear pads on the trepanning head and the workpiece has been overcome by providing, instead, rollers 62 between headpiece 24 and workpiece 18 and by lubricating such rollers by oil under high pressure bled from tube 70 and directed on such rollers by passageways 64.

It is also to be noted that hereby it is immaterial whether or not workpiece 18 has a longitudinal hole 90 therethrough, as shown in Fig. 2, as the oil is fed directly to cutting tool 46 and rollers 62 by tubes 70 and 68, respectively, and out through recess 34 to groove 21. Therefore, it is possible to remove from a hollow cylinder another or more hollow cylinders of smaller diameters without altering the means and method used for removing a solid core.

It is clearly apparent from the foregoing that there is herein provided an apparatus for trepanning holes in a metallic workpiece which is an advance in the art and which is especially well adapted for trepanning titanium.

Although a particular embodiment of the invention has been described in detail herein, it is evident that many variations may be devised within the spirit and scope thereof and the following claims are intended to include such variations.

We claim:

1. A device for boring by trepanning a rotating workpiece including a cylindrical bar actuatable against the rotating workpiece, a hollow cylindrical headpiece mounted on one end of said bar for engagement with the workpiece, said headpiece being of larger diameter than said bar to form an annular shoulder at the junction thereof, a cutting tool having a channel terminated by a spoonlike depression in the leading face thereof normal to a cutting edge of said tool, said cutting tool being replaceably mounted in the forward end of said headpiece for cutting an annular groove in said workpiece to receive said headpiece, a well in said bar for receiving without circumferential engagement the core produced by said groove, a pair of rollers rotatably mounted in said headpiece on axles parallel with the axis of the workpiece, said rollers being disposed to take the thrust imposed against said headpiece by said cutting tool, a forked passageway in said headpiece leading from said shoulder for communication with said rollers, a hole leading from said shoulder to said channel in said cutting tool, and tubes disposed along said bar for communication with said hole and said passageway for supplying oil at more than 2000 p. s. i. pressure to said rollers and to said channel to lubricate and cool the working areas of said cutting tool.

2. A device for boring a rotating workpiece by trepanning including pump means for supplying oil under pressure, a hollow cylindrical bar actuatable longitudinally against the workpiece, a cutting tool mounted to one end of said bar for cutting engagement with the workpiece to form a cylindrical core receivable within said bar, a channel in said cutting tool terminated by a spoonlike depression in the leading face thereof, and passage means for delivering oil from said pump means to said channel for dispersion by said depression between the chip formed by the cutting tool and the leading edge thereof to prevent chemical or physical combination between the chips and said tool.

3. A device for boring a rotating workpiece by trepanning including a cylindrical bar terminated by a headpiece and having an axial well therethrough, a cutting tool mounted to said headpiece for cutting engagement with the workpiece to cut an annular groove therein and form a core receivable by said well without contact with the walls thereof, a plurality of rollers rotatably mounted to said headpiece to rollingly support said bar in the annular groove, tube means leading to said headpiece from a pump means for supplying oil under pressure and passageway means for respectively directing sufficient oil from said tube means to said rollers and said cutting tool for insulating said device from the workpiece except at the cutting edge of said cutting tool to prevent metal to metal contact therebetween.

References Cited in the file of this patent

UNITED STATES PATENTS

| | | |
|---|---|---|
| 537,044 | Krauss | Apr. 9, 1895 |
| 1,322,399 | Baumann et al. | Nov. 18, 1919 |
| 1,341,565 | Krepps | May 25, 1920 |
| 1,918,642 | Hall | July 18, 1933 |
| 2,273,258 | Groene | Feb. 17, 1942 |
| 2,510,203 | Andreasson | June 6, 1950 |
| 2,610,529 | Atkinson | Sept. 16, 1952 |